(12) United States Patent
Devaney

(10) Patent No.: US 7,977,809 B2
(45) Date of Patent: Jul. 12, 2011

(54) TIDAL STREAM ENERGY CONVERSION SYSTEM

(76) Inventor: Theo Devaney, County Wicklow (IE)

( * ) Notice: Subject to any disclaimer, the term of this patent is extended or adjusted under 35 U.S.C. 154(b) by 391 days.

(21) Appl. No.: 12/096,413

(22) PCT Filed: Dec. 8, 2006

(86) PCT No.: PCT/EP2006/011870
§ 371 (c)(1),
(2), (4) Date: Sep. 16, 2008

(87) PCT Pub. No.: WO2007/065717
PCT Pub. Date: Jun. 14, 2007

(65) Prior Publication Data
US 2009/0015014 A1   Jan. 15, 2009

(30) Foreign Application Priority Data

Dec. 8, 2005   (IE) .................................. S2005/0821

(51) Int. Cl.
*F03B 13/10*   (2006.01)
(52) U.S. Cl. ........................................... 290/53; 290/42
(58) Field of Classification Search ............. 290/42–43, 290/53–54; 60/398, 498, 497, 500–502, 60/505, 495–496, 698, 641.7; 415/7, 3.1; 416/85; 417/330–333
See application file for complete search history.

(56) References Cited

U.S. PATENT DOCUMENTS

| | | | | |
|---|---|---|---|---|
| 4,170,738 A * | 10/1979 | Smith | ............................. | 290/42 |
| 4,303,834 A * | 12/1981 | Li | .................................. | 290/55 |
| 4,859,146 A | 8/1989 | Labrador | | |
| 5,854,516 A * | 12/1998 | Shim | ............................. | 290/53 |
| 5,946,909 A * | 9/1999 | Szpur | ............................. | 60/398 |
| 7,474,013 B2 * | 1/2009 | Greenspan et al. | ............. | 290/53 |
| 7,525,212 B1 * | 4/2009 | Catlin | ............................ | 290/53 |
| 7,650,749 B2 * | 1/2010 | Borgesen | ........................ | 60/495 |

FOREIGN PATENT DOCUMENTS

| | | |
|---|---|---|
| DE | 2152637 | 4/1973 |
| GB | 2131490 | 6/1984 |
| GB | 2131491 | 6/1984 |
| JP | 2003269318 | 9/2003 |
| WO | WO2005054669 | 6/2005 |

OTHER PUBLICATIONS

International Search Report for International Application No. PCT/EP2006/011870 dated Mar. 27, 2007.

* cited by examiner

*Primary Examiner* — Michael C Zarroli
(74) *Attorney, Agent, or Firm* — Van Dyke, Gardner, Linn & Burkhart

(57) ABSTRACT

An energy conversion system for converting tidal energy into electrical energy includes a barrier deployable across a body of water. The barrier has an upper and lower closed loop of cable between which are secured a series of sail arrays adapted to effect displacement of the cables around the closed loop, which motion is converted into electrical energy by one or more transducers forming part of the system.

14 Claims, 14 Drawing Sheets

TIDAL STREAM ENERGY CONVERSION SYSTEM

The present invention relates to an energy conversion system, and in particular an energy conversion system adapted to convert tidal energy into electrical energy.

Sustainable energy has become a crucial part of energy production world-wide. However, as yet, it only accounts for a fraction of the energy produced, but is on the increase. Ireland, in line with the Kyoto Agreement is also looking to expand its renewable energy production, with many schemes already implemented, and more planned for the future.

A major force acting on our planet is the force of gravity exerted by the moon, and to a lesser extent by the sun, and in particular on the oceans of our planet. This gravitational force moves billions of gallons of water twice daily with the spin of our planet, commonly knows as tidal flow. For decades peopled have harnessed this energy where there has been a sufficient tidal head to warrant building a tidal barrage across an estuary or the like. When the tide is fully in, the gates to the barrage close and the water is run through turbines to produce electrical energy. However, this system only becomes economically viable when the energy produced can be offset against the substantial cost of building the barrage.

It is therefore an object of the present invention to provide an energy conversion system for generating electrical energy from the tidal movements of a body of water, which system does not significantly impact on the fragile sea shore and estuary ecosystems.

It is a further object of the present invention to provide an energy conversion system powered by the tidal movements of a body of water, which system does not result or require the flooding of surrounding lands, or markedly change the local tidal regime.

It is a still further object of the present invention to provide an energy conversion system for generating electrical energy from the tidal movements of a body of water, which system is amenable to large scale deployment, producing significant quantities of electrical energy.

The present invention therefore provides an energy conversion system for harnessing tidal energy from a body of water, the system comprising a barrier deployable beneath and across at least a portion of the body of water, and a transducer coupled to the barrier to facilitate the conversion to electrical energy, in use, of tidal pressure exerted on the barrier.

Preferably, the barrier comprises at least one sail adapted to move in a direction substantially transverse to the direction in which the tide is flowing in the body of water.

Preferably, the barrier comprises at least one support to which each sail is secured, the at least one support being coupled to the transducer.

Preferably, each sail comprises a substantially rigid frame.

Preferably, the configuration of each sail is adaptable to enable the system to function regardless of the direction of flow of the tide.

Preferably, the support comprises an upper cable and a lower cable.

Preferably, the barrier comprises at least one sail array comprising a plurality of the sails fixed relative, and in generally parallel spaced relation, to one another, the array being hingedly mounted to the support.

Preferably, each sail array comprises trimming means adapted to effect a desired alignment of the sails relative to the direction of tidal flow.

Preferably, the trimming means comprises a vane located, in use, on a downstream side of the array.

Preferably, each array is hingedly mounted to the or each support about an axis which substantially corresponds, in use, with the centre of pressure of the array.

Preferably, each array is hingedly mounted to the or each support about an axis, the array being mass balanced about the axis.

Preferably, the upper and lower cables each comprise a closed loop.

Preferably, the system comprises guide means at either side of the barrier which respectively define a reversing path along which the upper and lower cables are constrained to move.

Preferably, the guide means is coupled to the transducer.

Preferably, the guide means comprises an array of guide wheels at least one of which is driven by the respective upper or lower cable, said at least one guide wheel being coupled to the transducer.

Preferably, the guide wheels are arranged in pairs mounted in space relation on a respective shaft.

Preferably, each sail array comprises means for switching the orientation of the respective trimming means between a first position and a second position.

As used herein, the term "barrier" is intended to mean an array of sails or the like which may be positioned across a stretch of water to be acted thereon, and is not intended to mean a barrier which will prevent the physical passage of water there past.

As used herein, the term "sail" is intended to mean any surface capable of generating thrust when placed in a flow of fluid such as a tidal flow of water.

As used herein, the term "hingedly" is intended to mean a method of mounting one component to another such that the two components can hinge or move relative to one another, and is not intended to be limited to a connection comprising an actual hinge.

As used herein, the term "mass balanced" is intended to mean that the weight of a component or apparatus, which is pivotally mounted about an axis, is distributed about the axis in such a way that the component is balanced on the axis.

The present invention will now be described with reference to the accompanying drawings, in which;

FIG. 1a-c illustrates schematic side elevations of a first embodiment of an energy conversion system according to the present invention, in various stages of operation;

Figure 8:
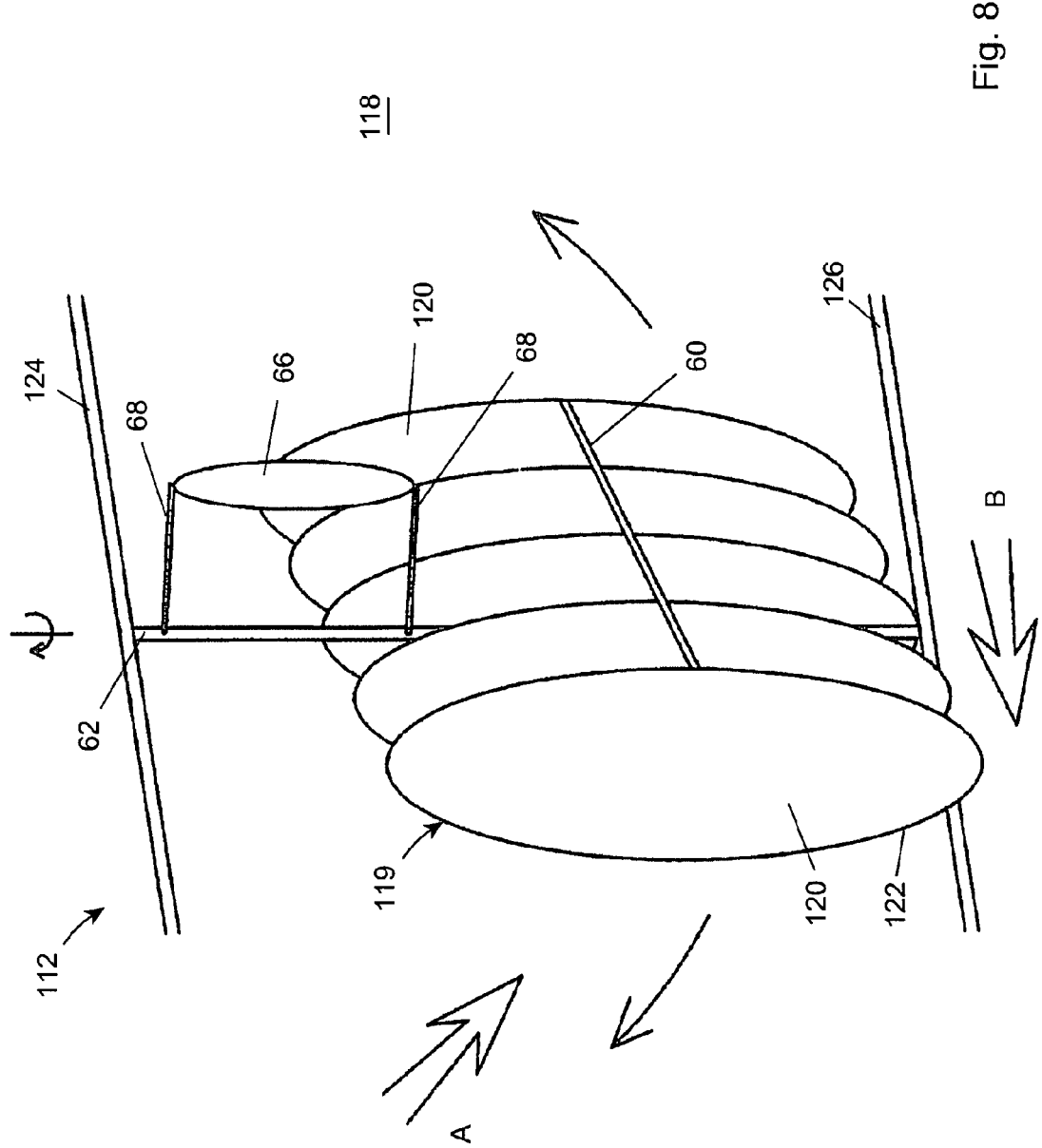
FIG. 8 illustrates a perspective view of a barrier forming part of a second embodiment of the energy conversion system according to the present invention.
Figure 12:
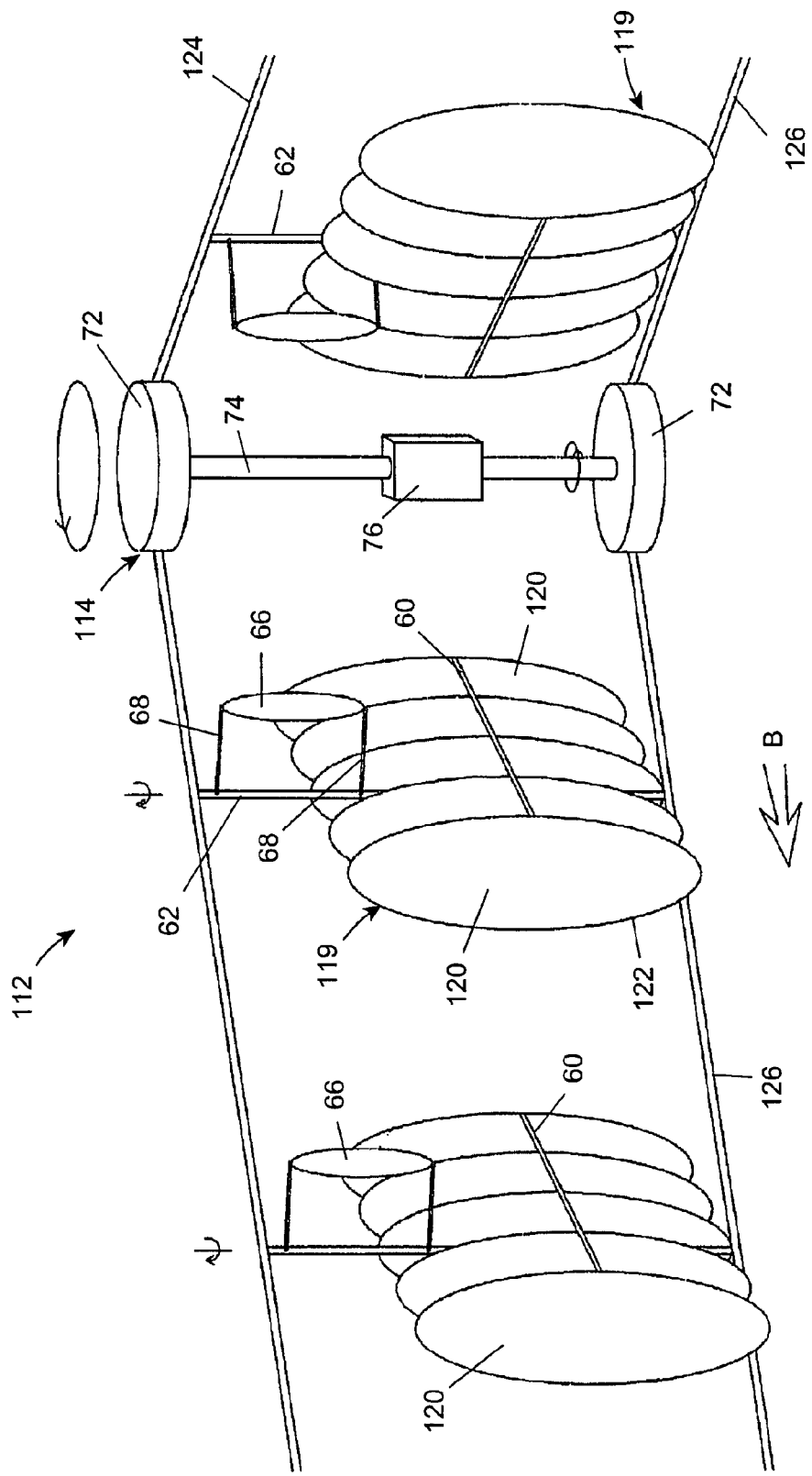
Figure 13:
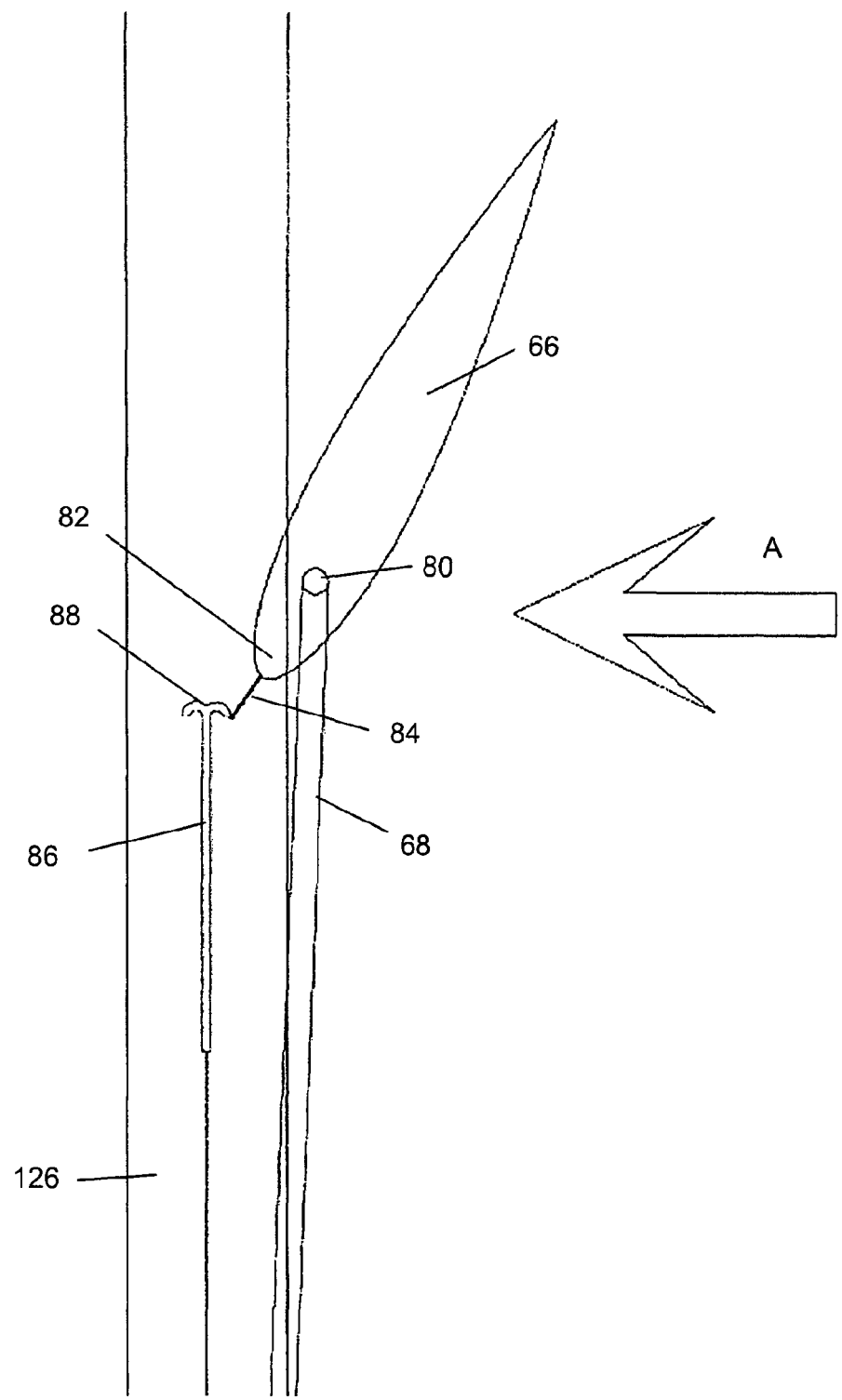
Figure 14:
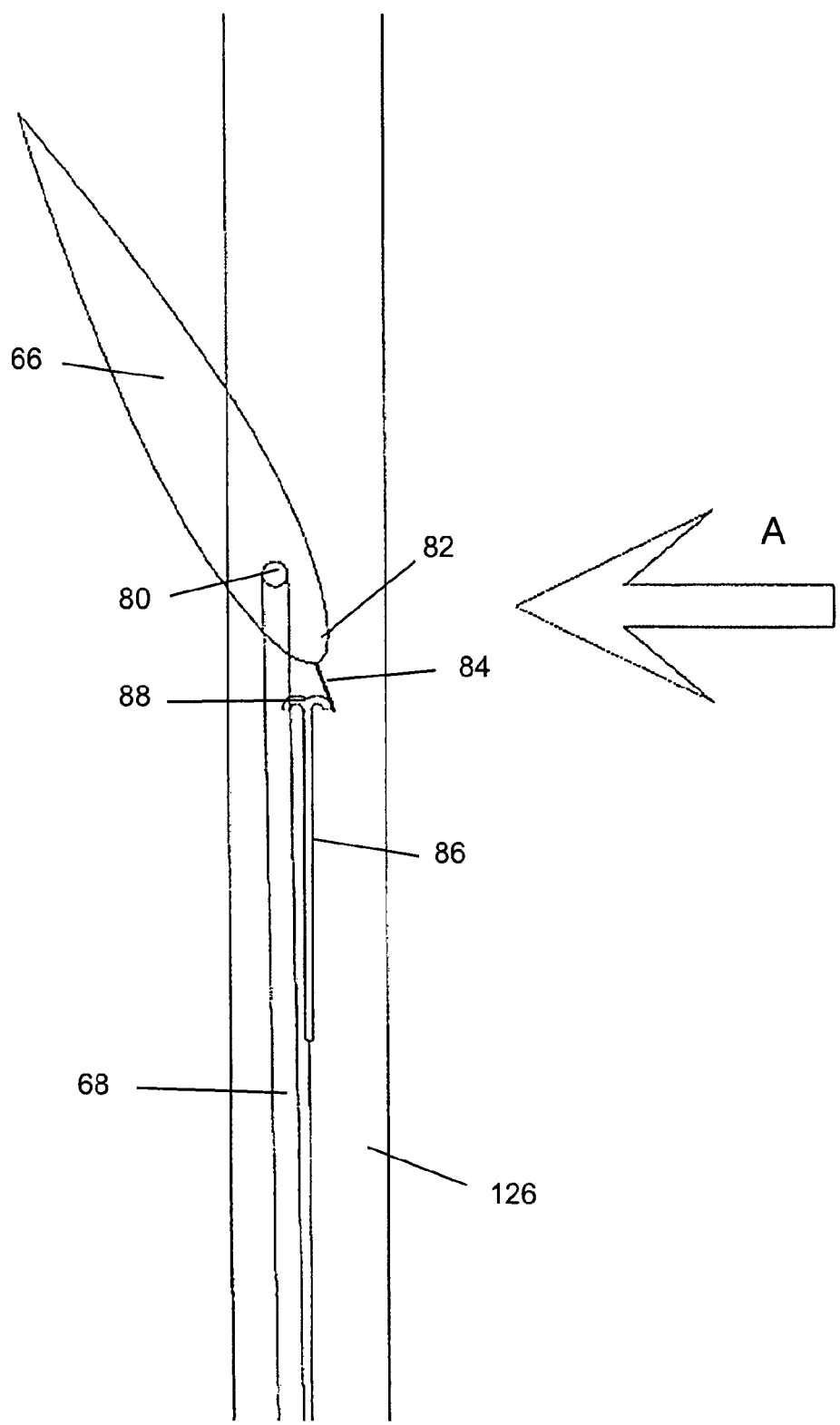
Figure 15:
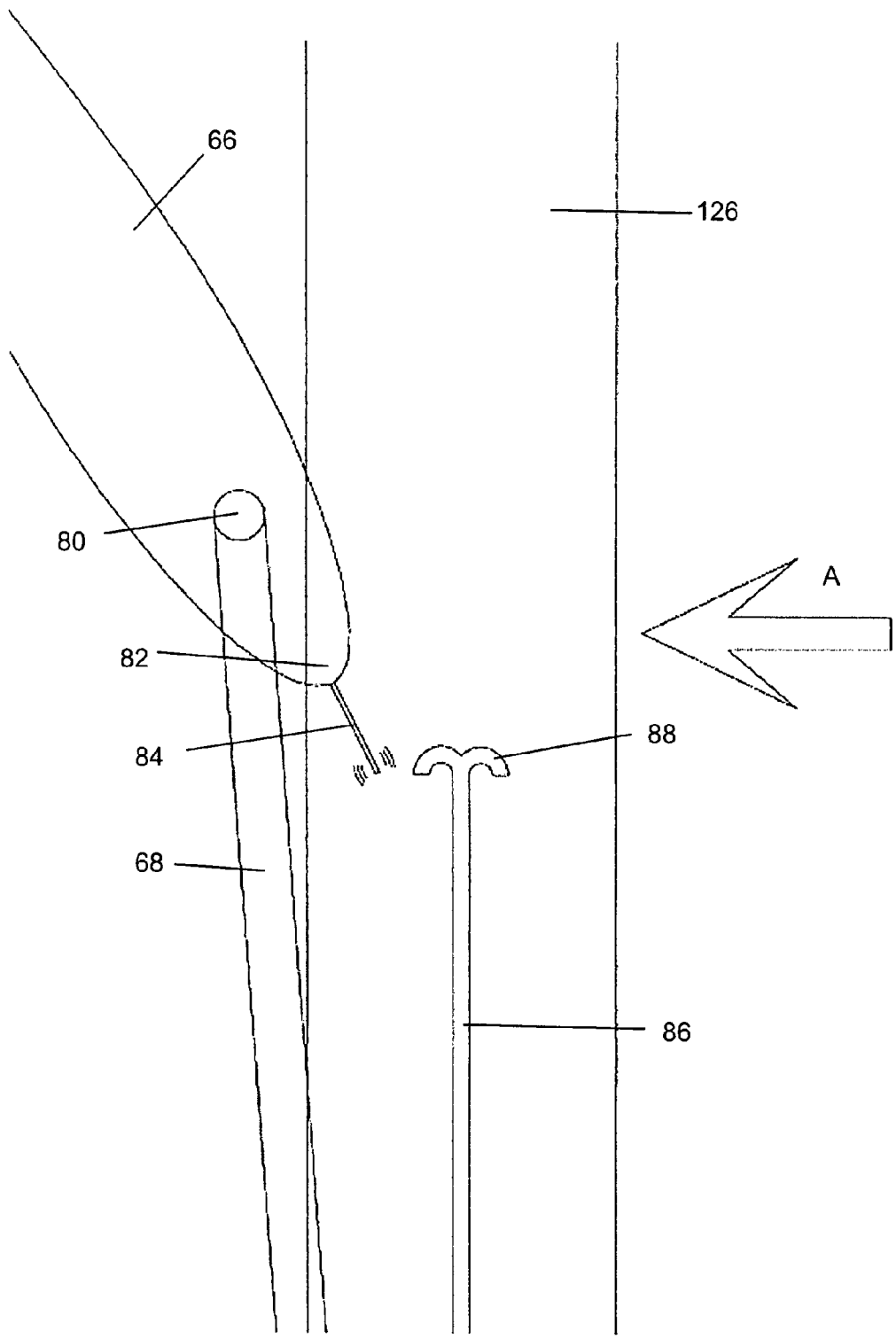

FIGS. 11A and 11B each illustrate a schematic plan view of the second embodiment of the energy conversion system of the invention;

FIG. 12 illustrates a perspective view of a portion of one side of the barrier of FIG. 8, illustrating guide means and a transducer forming part of the second embodiment of the energy conversion system;

FIG. 13 illustrates trimming means forming part of the barrier of FIG. 8, in a first position;

FIG. 14 illustrates the trimming means of FIG. 13, having just been displaced into a second position; and FIG. 15 illustrates the trimming means of FIG. 14, also in the second position but slightly advanced from the location of FIG. 14.

Figure 4:
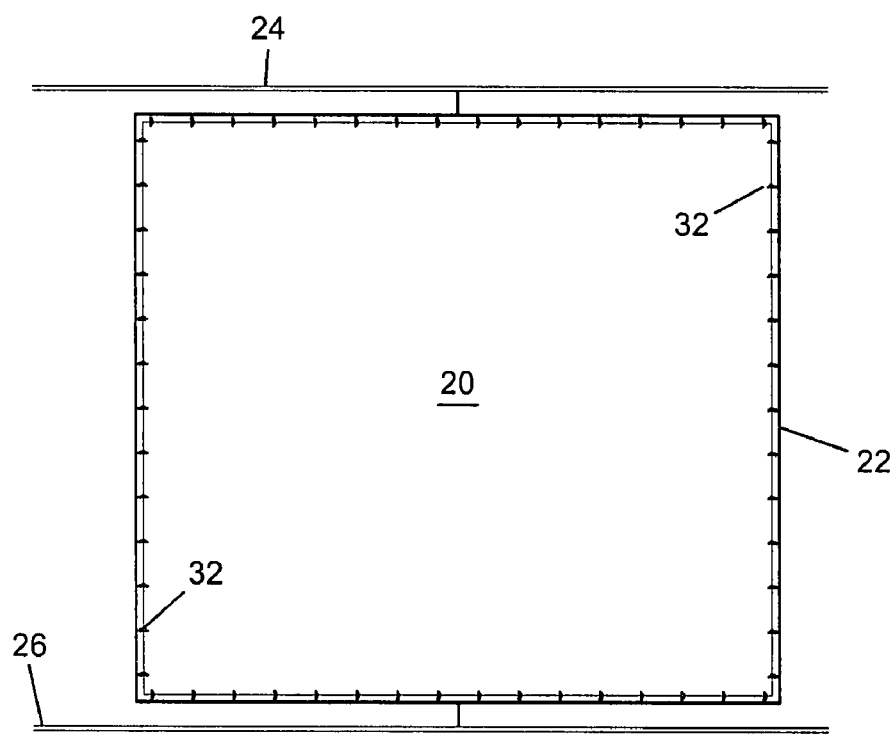
FIG. 4 illustrates a schematic front elevation of a sail forming part of the barrier of FIG. 2.
Figure 5:
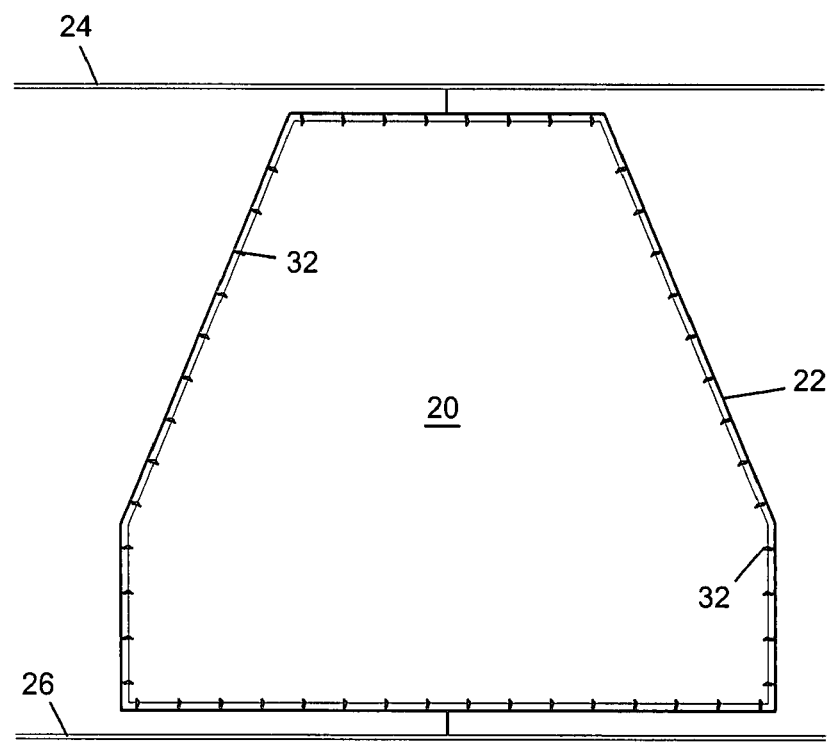
FIG. 5 illustrates a schematic front elevation of an alternative sail, which may form part of the barrier of FIG. 2.
Figure 6:
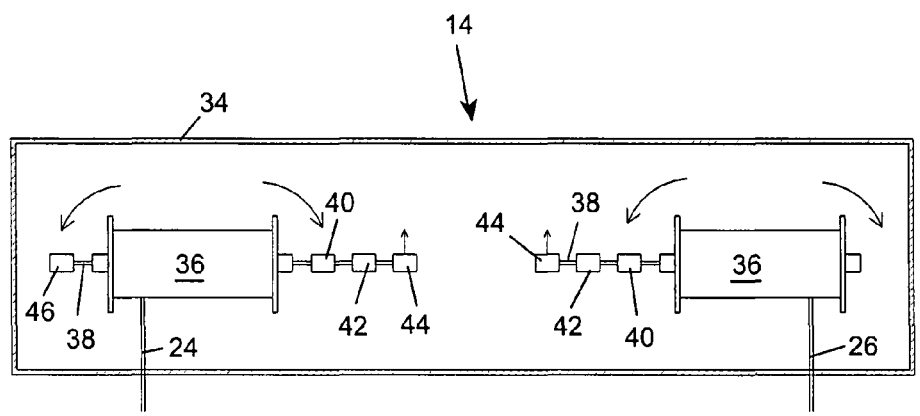
FIG. 6 illustrates a schematic plan view of a pair of transducers forming part of the energy conversion system of the first embodiment of the present invention.
Figure 7:
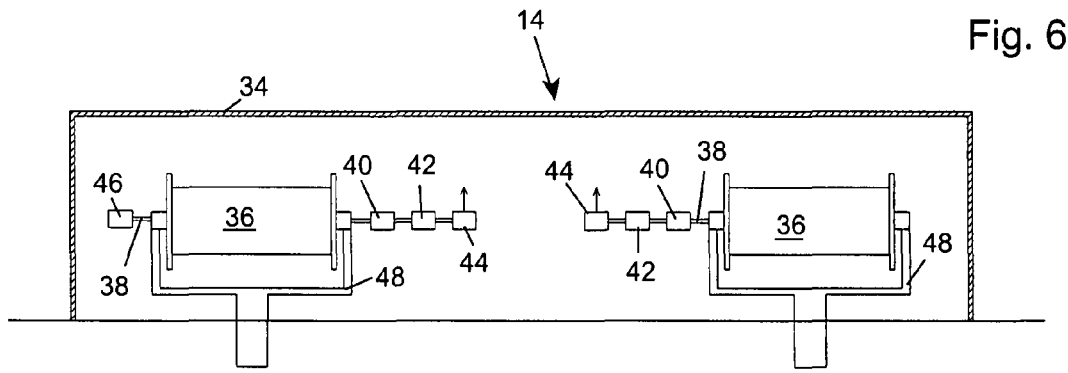
FIG. 7 illustrates a schematic front elevation of the transducers of FIG. 6.

Referring now to FIGS. 1 to 7 of the accompanying drawings, there is illustrated a first embodiment of an energy conversion system, generally indicated as 10, for use in harnessing tidal energy for conversion into electrical energy. The system 10 comprises a barrier 12 which is suspended, in use, across and beneath a body of water 18, where in the embodiment illustrated, the body of water 18 is located within a channel 16. The barrier 12 is preferably capable, as will be described in detail hereinafter, of traversing a substantial portion of the width of the channel 16, in order to maximise the efficacy of the system 10. The barrier 12 is coupled, at either end, to a pair of transducers 14, as illustrated in FIGS. 6 and 7, which transducers 14 are preferably land based, on either side of the channel 16, within a purpose built housing 34. The system 10 is adapted, again as will be described in greater detail hereinafter, to convert tidal energy from the body of water 18 into electrical energy, by means of the barrier 12 and transducers 14 in operative association therewith.

Figure 1A:
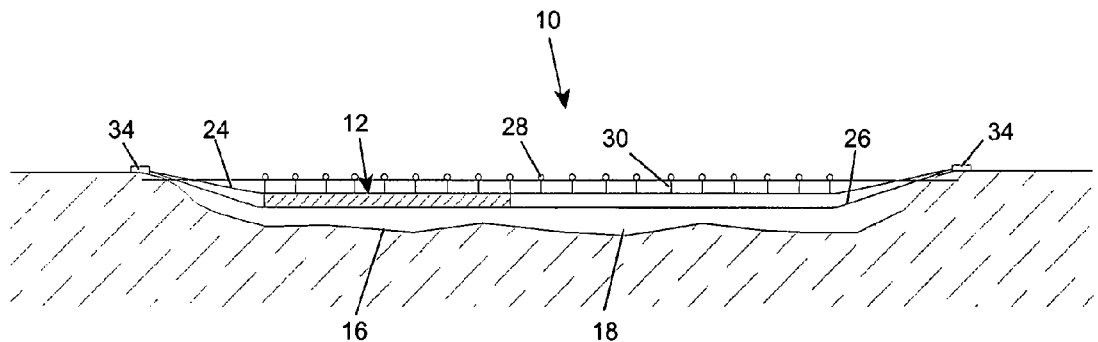
Figure 1B:
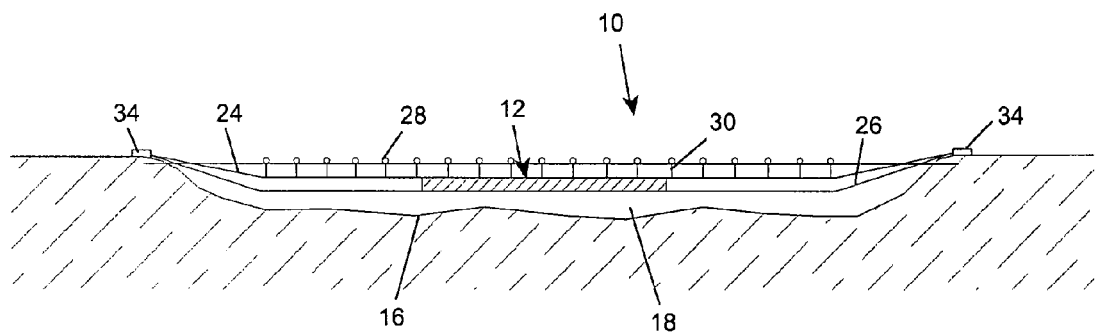
Figure 1C:
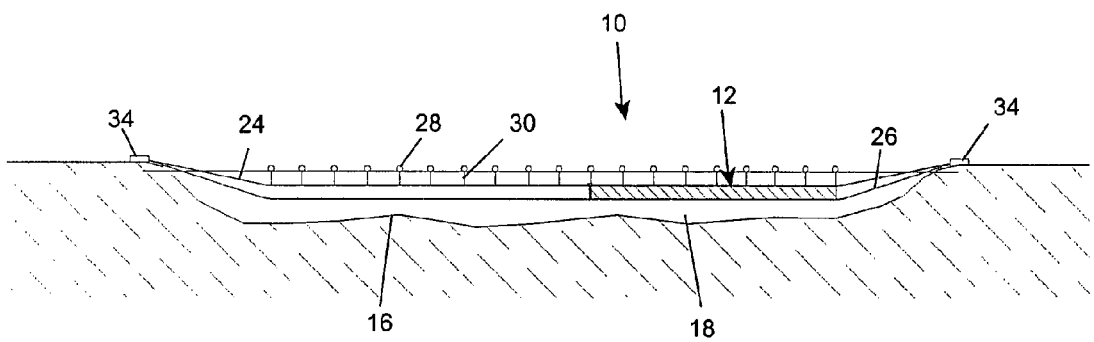
Figure 2:
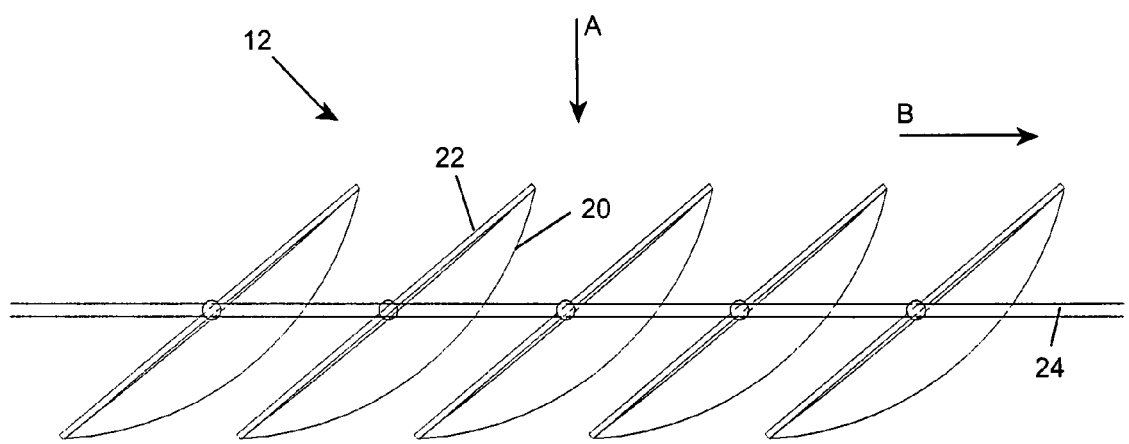
FIG. 2 illustrates a schematic plan view of a barrier forming part of the system illustrated in FIG. 1.

Thus, referring in particular to FIGS. 1 and 2 of the accompanying drawings, the barrier 12 is, in the embodiment illustrated, formed from a plurality of sails 20, each mounted in a respective supporting frame 22, each sail 20 being formed from a material having suitable properties. As the barrier 12, and consequently the sails 20, is submerged, usually in salt water, and experiences significant forces in use, it is preferable that the sails 20 are formed from a material having the necessary strength, flexibility, and non-pollutant properties. Examples of such materials are aramids, polymers, carbon fibre, 100% nylon, etc. The barrier 12 is framed by a support in the form of an upper cable 24 and a lower cable 26, both preferably formed from steel braid, or any other suitable equivalent. The upper and lower cables 24, 26 serve, in combination with various additional elements as will be described hereinafter, to maintain the intended configuration and orientation of the barrier 12, and to effect the efficient transfer of the forces acting on the barrier 12, in use, to the transducers 14, as will be described.

In order to ensure that the barrier 12 remains suspended within the channel 16, and does not sink, a plurality of buoys 28 are secured to the upper cable 24 along the length thereof. The weight of the barrier 12, in addition to the lower cable 26, ensures that the barrier 12 is maintained in a substantially vertical orientation. However, depending on the operating conditions of the system 10, additional ballast (not shown) may be secured to the lower cable 26, or alternatively to the barrier 12 itself. Each buoy 28 is secured to the upper cable 24 by a tether 30 which, in the embodiment illustrated, is approximately 10 meters in length, allowing the barrier 12 to sit at a depth of 10 meters below the surface of the body of water 18. This therefore ensures that the majority of boats (not shown) may pass over the barrier 12 without interfering therewith. Thus, as the barrier 12 is also secured to each pair of land based transducers 14, the barrier 12 is stretched across the channel 16 to be acted on by the tidal flow of the body of water 18.

Thus, referring to FIG. 2, as the tide advances in the direction of arrow A, each sail 20 of the barrier 12 is forced to bellow outwards in said direction, as a result of the hydraulic pressure thereon, the respective frame 22 securing the sail 20 in this bellowed orientation. Each frame 22 is preferably disposed at an angle of approximately 45° to the direction of tidal flow, although this angle may of course be varied depending on the operating conditions and requirements of the energy conversion system 10.

Figure 3A:
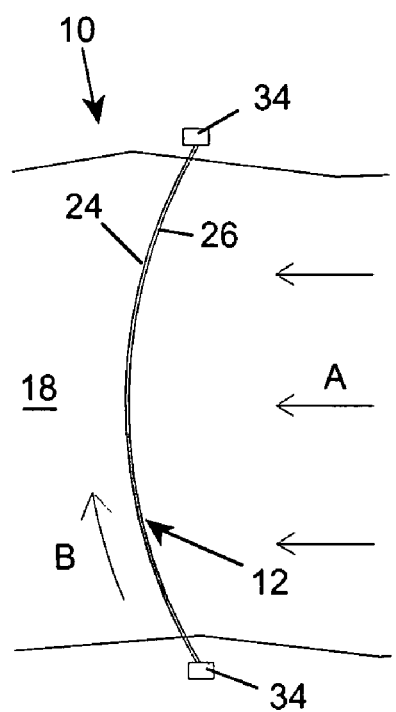
FIG. 3a illustrates a schematic plan view of the energy conversion system of FIGS. 1 and 2, where the tide is acting in a first direction.

It will therefore be appreciated that each sail 20 acts like the sail of a boat (not shown), generating a force transverse to the direction of tidal flow, as indicated by the arrow B in FIG. 2. This force causes the entire barrier 12 to be drawn across the channel 16 in the direction of arrow B, the stages of which are illustrated in FIG. 1. FIG. 1a shows the position of the barrier 12 as the tide begins to flow, with FIG. 1b showing the barrier halfway across the channel 16, and FIG. 1c showing the barrier having reached the far side of the channel 16, just as the tide begins to turn. This displacement across the channel 16 is facilitated by additional lengths of the upper cable 24 and lower cable 26 being drawn from the transducer 14 which the barrier 12 is moving away from. The force generated by the barrier 12 in the direction of arrow B is thereby converted, by the respective transducer 14, into electrical energy, as will be described hereinafter. On the opposite side of the barrier 12, the slack consequently created in the upper cable 24 and lower cable 26 is taken up by the transducer 14 which the barrier 12 is moving towards, again as will be described, thereby preventing the barrier 12 from drifting out of transverse alignment with the direction of tidal flow, as indicated by the arrow A in FIG. 2. However, as illustrated in FIG. 3a, the barrier 12 will be slightly bowed as a result of the tidal force acting thereon. It is of course preferable to maintain this bowing to a minimum, in order to maintain the transverse orientation of the barrier 12 relative to the direction of tidal flow.

Figure 3B:
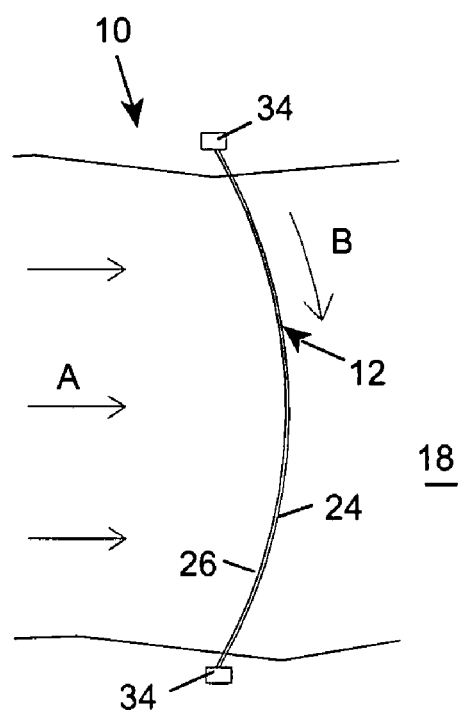
FIG. 3b illustrates a schematic plan view of the energy conversion system of FIG. 3a, where the tide is acting in a second direction, opposed to the first direction.

Once the direction of flow of the tide reverses, which will occur approximately every 6 hours, each sail 20 will then be forced to bellow out in the opposite direction, facilitated by the flexibility thereof, and the fixed nature of the frame 22 supporting same. As the frame 22 is preferably at an angle of approximately 45° to the direction of tidal flow, each sail 20 will have approximately the same configuration and orientation, regardless of the direction of tidal flow. Once the tidal flow reverses, the stages illustrated in FIG. 1a-c will be reversed, with the barrier travelling back across the channel 16 from right to left. Referring to FIG. 3b, the barrier 12 and upper and lower cables 24, 26 will thus bellow slightly in the opposite direction, due to the drag experience thereby. In order to facilitate this reversal of travel of the barrier 12, the operation of the transducers 14 on either side of the barrier 12 must also be reversed, as will be described hereinafter.

In order to achieve maximum electrical generation during each traverse of the barrier 12 across the channel 16, it is preferable that the barrier 12 travel the maximum distance possible across the channel 16. This is achieved by varying the number and dimension of the sails 20 forming the barrier 12. Clearly the greater the number of sails 20 the greater the force that will be generated by the barrier 12, and the more electricity therefore generated. Referring to FIGS. 4 and 5, the shape of the sail 20, and thus the surrounding frame 22, may be varied to give the system 10 desired operating characteristics. Clearly, the larger the sails 20, the greater the force that will be generated, but also the greater the drag generated, and consequently the bellowing of the barrier 12 in the direction of tidal flow. Each sail 20 is preferably releasably secured to the respective frame 22 by a plurality of fasteners 32, thereby permitting the repair or replacement of a damaged sail 20.

Turning now to FIGS. 6 and 7, one method by which the force generated by the barrier 12 is converted to electricity will now be described. Thus, on either side of the barrier 12, the upper cable 24 and the lower cable 26 are each coupled to a respective transducer 14, the configuration and operation of which are identical. It will therefore be sufficient to describe the configuration and operation of one of the transducers 14, and in this case the transducer 14 to which the upper cable 24 is coupled. Each pair of transducers 14 is located within a suitable housing 34, as hereinbefore described. The major component of the transducer 14 is a drum 36, around which a length of the upper cable 24 is wound and secured. The drum 36 is mounted on an axis 38, one side of which is connected to a gear box 40. The gear box 40 is connected in series to a second gear box 42, which is again connected in series to a generator 44, which generator 44 may be connected directly to the national grid, or to a suitable storage facility (not shown). It will of course be appreciated that a single gearbox (not shown) could replace the gearbox 40 and second gearbox 42, as could any other suitable equivalent.

Thus, as the barrier 12 begins to traverse the channel 16, the upper cable 24 (and the lower cable 26 connected to the adjacent transducer 14) is drawn out of the housing 34, and thus the drum 36 begins to turn on its axis 38. However, due to the slow speed of the barrier 12 as it traverses the channel 16, the rotation of the drum 36 will be relatively slow, and it is for this reason that the gear box 40 is connected thereto. Therefore, as the drum 36 rotates as the upper cable 24 is drawn outwardly therefrom, the gear box 40 will cause the second gear box 42 to operate at a higher speed, which in turn drives the electric generator 44, creating electricity.

When the direction of flow of the tide reverses, the pair of transducers 14 on the opposed side of the barrier 12 will then begin to generate electricity as hereinbefore described, while the pair of transducers 14 towards which the barrier 12 is now advancing must be utilised to take up the slack in both the upper cable 24 and the lower cable 26. In order to effect this take-up in slack, each transducer 14 further comprises a motor 46 (not illustrated on the right hand transducer 14 of FIGS. 6 and 7), which in the embodiment illustrated is mounted on the opposed side of the drum 36. The motor 46 is used to reverse the rotation of the drum 36, and thus wind up the slack in the cables 24, 26. Due to the high loads experienced by the transducers 14, and in particular the drums 36, each drum 36 is preferably secured to the ground by means of a frame 48 or suitable equivalent. It will be appreciated that in winding the cables 24, 26 back onto the respective drum 36, energy will be expended, but said energy expenditure will be far less than that generated by the system 10, and thus the net energy produced by the system 10 will be positive.

It will also be appreciated that as the cables 24, 26 are fed from the respective transducer 14, additional buoys 28 should be automatically connected thereto in order to maintain the barrier 12 at the correct depth as it traverses the channel 16. This may be done in any conventional manner.

Referring now to FIGS. 8-15 of the accompanying drawings, there is illustrated a second embodiment of an energy conversion system, generally indicated as 110, which is again adapted to convert tidal energy into electricity. In this second embodiment, like components have been accorded like reference numerals, and unless otherwise stated, perform a like function. As with the first embodiment, the system 110 comprises a barrier 112 which is suspended, in use, across and beneath a body of water 118, the body of water 118 being located within a channel 116 or similar suitable location.

Figure 11:
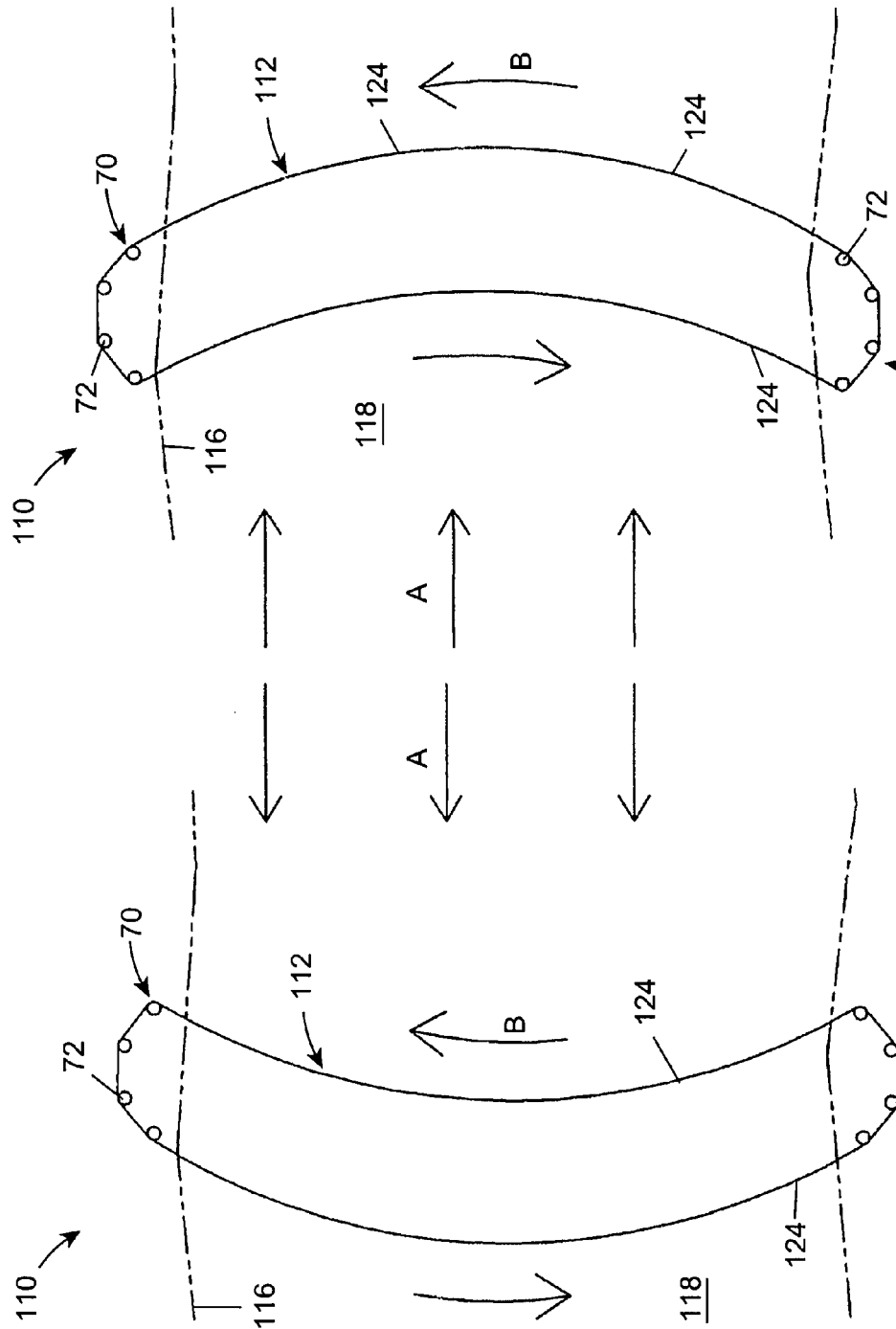

Referring to FIG. 11A, the system 110 is illustrated with the tide flowing in a first direction indicated by arrow A, while FIG. 11B illustrates the system 110 with the tide flowing in the opposite direction. The barrier 112 is formed with an the upper cable 124 and a lower cable 126 (not visible in FIG. 11) as a closed loop, having an end portion 70 at either side of the barrier 112, where the path of the cables 124, 126 are reversed through substantially 180 degrees as will be described hereinafter in detail. Mounted between and in series along the length of the upper and lower cables 124, 126 are a plurality of sail arrays 119 (not illustrated in FIG. 11), which are adapted, as will be described hereinafter in detail, to displace the cables 124, 126 across the channel in order to generate electricity. The system 110 is arranged, again as will be described hereinafter, such that the upper and lower cables 124, 126 move in one direction only around the closed path defined thereby, regardless of the direction of tidal flow.

In the embodiment illustrated, each end portion 70 is preferably land based, although it will be appreciated that the end portions 70 could be moved into the body of water 118, although this would shorten the working length of barrier 112, and would cause significant difficulties in the initial deployment of the system 110. Thus it is preferable that each end portion 70 is land based, but preferably located within a water filled channel cut into the bank on each side of the channel 116, and in fluid communication with the body of water 118. This arrangement then avoids the requirement to raise the upper and lower cables 124, 126 out of the body of water 118 for the transition from the body of water 118 to the shore on either side thereof. Thus the system 110 is not required to expend work in lifting each of the sail arrays 119, and the cables 124, 126 carrying same, out of the water 118 in order to traverse each end portion 70. In addition, by maintaining the upper cable 124 and lower cable 126 in water, the effective weight of the barrier 112 is lowered, and thus the strength of the cables 124, 126 can be selected accordingly, reducing the required strength, and therefore the weight of, the cables 124, 126. Each end portion 70 preferably has a diameter or span of between 500 meters and 1 kilometer although this may of course be varied to suit the particular requirements of the body of water 118 across which the barrier 112 is deployed.

Referring in particular to FIGS. 8 and 12, the barrier 112 comprises at least one, and preferably a plurality of the sail arrays 119 (not illustrated in FIG. 11), each array 119 comprising a plurality of sails 120, which are again preferably formed from any suitable material, for example an aramid fibre based fabric, polymer, carbon fibre or nylon. Each sail 120 is secured within a substantially rigid frame 122, and the entire array 119 is pivotally mounted between the upper cable 124 and the lower cable 126, as will be described in greater detail hereinafter. The barrier 112 preferable comprises a large number of the sail arrays 119 arranged in series across the length of the barrier 112 between the upper cable 124 and the lower cable 126.

The plurality of sails 120, a total of five being provided in the arrays 119 of the embodiment illustrated, but which may be greater or lesser in number, are fixed relative and substantially parallel to one another by means of a substantially rigid cross member 60. Any other means may of course be used to fix the sails 120 in the positions illustrated. The cross member 60 is fixed by any suitable means, for example welding, to each of the frames 122. The sail array 119 further comprises an axle 62 which is pivotally mounted between the upper cable 124 and the lower cable 126, and is also rigidly secured to the central sail 120, via the respective frame 122. Although the axle 62 is illustrated as extending continuously from the upper cable 124 to the lower cable 126, it is preferably interrupted or absent in the area of the central sail 120, in order to allow the sail to bellow unhindered in either direction. Thus in practice the axle 62 would preferably be in the form of two stub axles (not shown), one secured between the uppermost point on the central frame 122 and the upper cable 124, and the other between the lowermost point of the central frame 122 and the lower cable 126.

Figure 10:
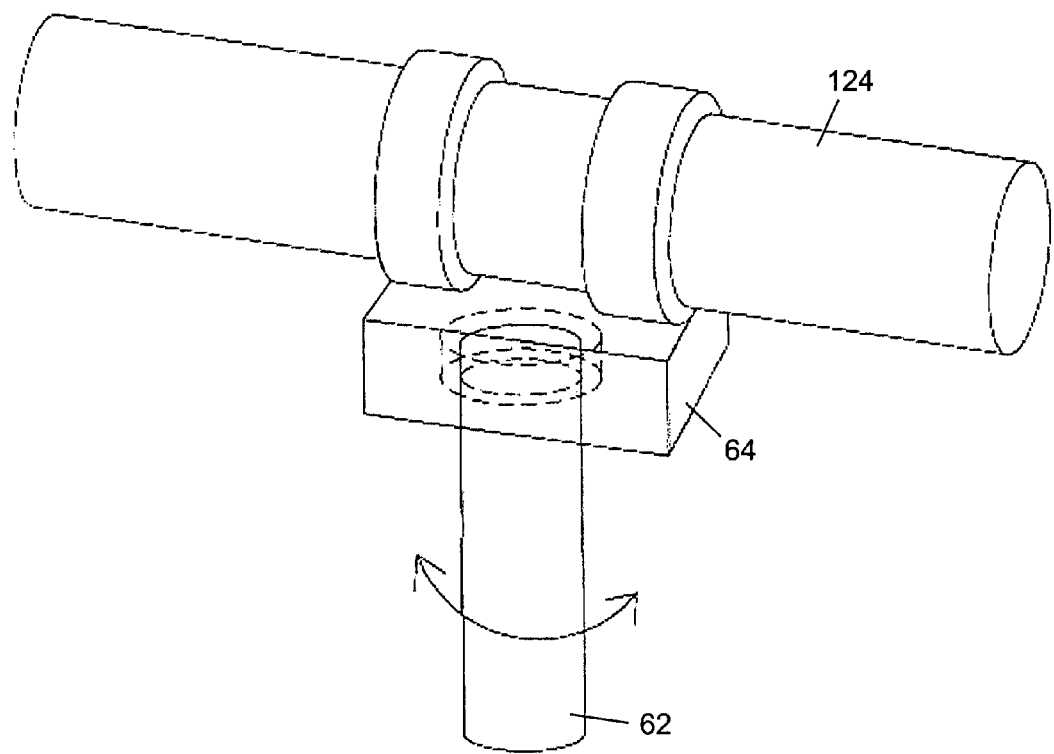
FIG. 10 illustrates a bearing assembly forming part of the barrier illustrated in FIGS. 8 and 9.

Referring to FIG. 10, it can be seen that the axle 62 is hingedly mounted to the upper cable 124 by means of a suitable bearing 64, which is clamped to the upper cable 124. An identical arrangement is provided between the axle 62 and the lower cable 126. In this way it will be appreciated that the sail array 119 is capable of pivoting about an axis defined by the axle 62, in order to vary the angle of attack with respect to the direction of tidal flow, as indicated by the arrow A in FIG. 8.

Each sail array 119 further comprises trimming means in the form of a vane 66 located beneath the upper cable 124 and substantially above the sails 120. In use, the vane 66 is located on the downstream side of the array 119, although it is possible to have the vane 66 located, in use, on the upstream side of the array 119. The vane 66 is secured to the axle 62 via a pair of struts 68. The vane 66 could of course be fixed to the central frame 122, or the cross member 60. It is however preferable that the vane 66 is not located directly behind the sails 120, in order to ensure that the vane 66 is controlled by the main tidal flow and not the flow passing between the sails 120. Although in FIGS. 8 and 12 the lowermost strut 68 is shown connected to the axle 62 at a position beneath the uppermost point of the central frame 122, as mentioned above, the axle 62 is preferably absent in the area of the sail 120. Thus in practice the lowermost strut 68 would be positioned slightly above the location shown, and in particular at a position on the axle 62 above the uppermost point of the central frame 122.

Figure 9:
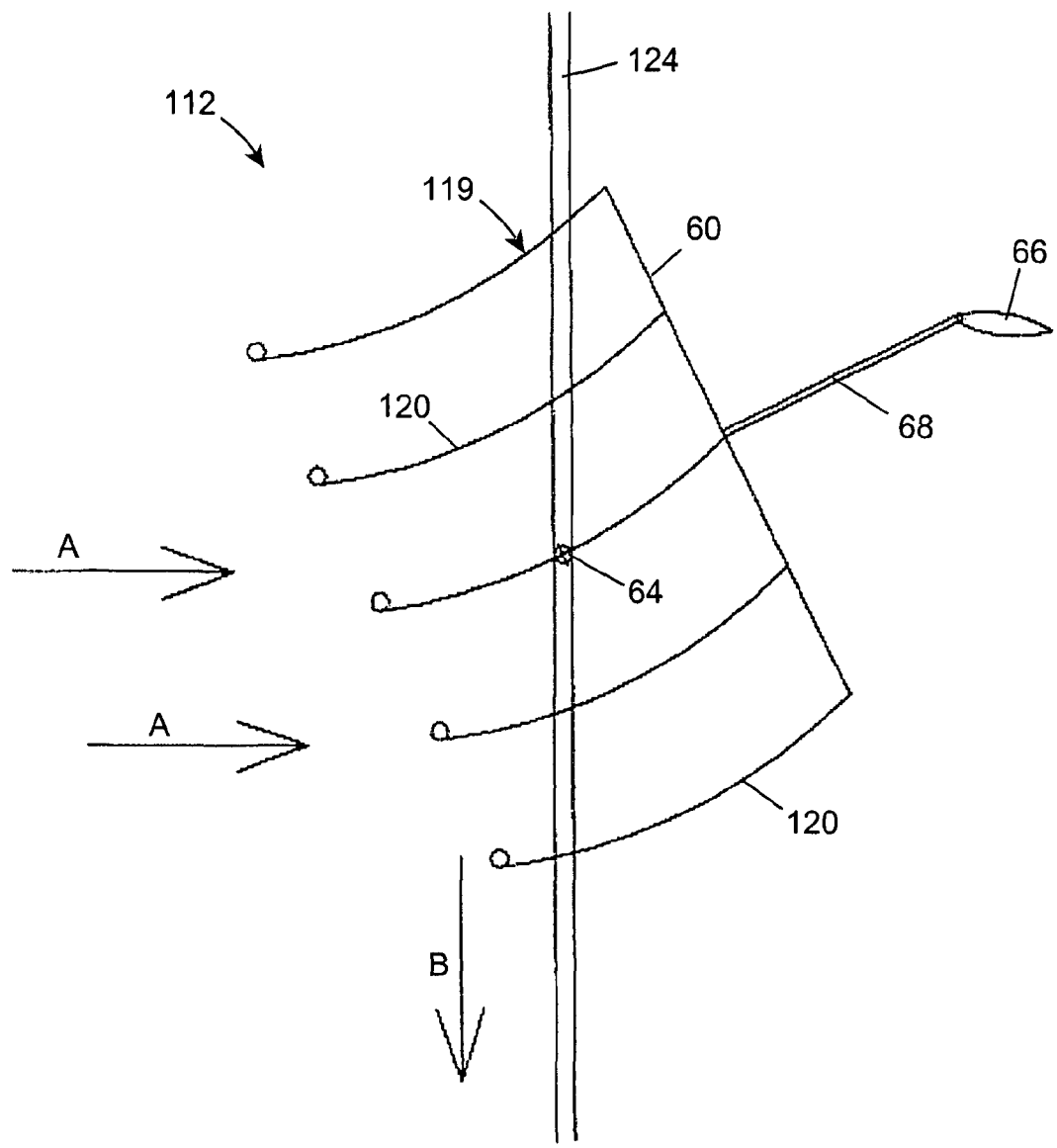
FIG. 9 illustrates a schematic plan view of the barrier illustrated in FIG. 8.

Referring in particular to FIG. 9, which is a schematic illustration of the array 119 shown in FIG. 8, it can been seen that the vane 66 is disposed, in the vertical plane, at a particular angle to the chord line of each of the sails 120, all of which are substantially parallel. For the reasons described hereinafter in detail, when the sail array 119 is deployed in a tidal flow, the self trimming vane 66 will align itself in parallel with the direction of tidal flow A. The vane 66, by careful design, is angled relative to the sails 120 such that with the vane 66 aligned parallel with the tidal flow, the sails 120 are disposed at the optimum angle of attack with respect to the direction of tidal flow A. The optimum angle of attack, in the present invention, is that angle which results in the sails 120 generating the maximum force in the direction of the arrow B. This orienting is made possible as a result of both the static mass balancing of each array 119 about the axle 62, and aligning the centre of pressure of each array 119 to be positioned substantially on the axle 62. By static mass balancing it is meant that weight of the array 119 is distributed about the axis 62 in a manner which results in the array 119 being balanced about the axis. In other words, the centre of gravity of the array 119 is located substantially on the axis 62, or sufficient close to same to achieve the desired result described below.

The location of the centre of pressure of the array 119 for a particular angle of attack, in this case the optimum angle of attack, may be manipulated by altering the draft or curvature of each of the sails 120. Thus the sails 120 when stretched taut under the influence of the tide as shown in FIG. 9, are designed to have an aerofoil profile which positions the centre of pressure of the overall array 119 in alignment with the axle 62. In the present embodiment this is achieved by aligning the centre of pressure of the central sail 120 with the axle 62, and providing an equal number of the sails 120 on either side of the central sail 120 or the axle 62.

With the array 119 statically mass balanced about the axle 62, and the centre of pressure of the array 119 positioned on the axle 62, it is possible, in use, for a relatively small force to rotate the array 119 on the axle 62. Thus if the vane 66 is positioned out of parallel alignment with the direction of tidal flow A, the relatively small force exerted on the vane 66 by the tidal flow will rotate the array 119 until the vane 66 is parallel to the direction of tidal flow A. In this orientation, the sails 120 are at the optimum angle of attack with respect to the tidal flow A. Due to the above design, the relatively small vane 66 is capable of maintaining the sails 120 in this position, despite the much greater force generated by the tide acting on the sails 120.

Referring to FIG. 11, it can be seen that in use the upper and lower cable 124, 126 will bow slightly in the direction of tidal flow A, which would result in a changing angle of attack of the sails 120 (not shown in FIG. 11) as the arrays 119 (not shown in FIG. 11) traverse the channel 116. However the provision of the self trimming vane 66 ensures that, regardless of the position of any one of the sail arrays 119, each of the sails 120 will be disposed at the optimum angle of attack relative to the direction of tidal flow A.

Referring to FIGS. 11 and 12, the system 110 comprises a transducer 114 comprising guide means in the form of an array of guide wheels 72 which are arranged in pairs mounted in spaced relation on a respective shaft 74, the upper and lower cables 124, 126 being guided by and passed the respective guide wheels 72. It can be seen that the end portion 70 on either side of the barrier 112 is essentially defined by an array of the guide wheels 72, four pairs of guide wheels 72 being provided at each end portion 70 of the embodied illustrated, in order to define a reversing path for the upper and lower cables 124, 126.

At least one, and preferably each shaft 74, drives a gear box 96 which may or may not be directly coupled to the shaft 74 as illustrated. Thus as each of the sail arrays 119 are displaced across the channel 116, the upper and lower cables 124, 126 will, by virtue of contact with the guide wheels 72, drive the guide wheels 72 and therefore the shaft 74, which in turn drives the gearbox 96 from which power may be derived in conventional fashion. Measures may be taken to reduce or eliminate slippage between the cables 124, 126 and the respective guide wheels 72. For example, a circumferential "V groove" could be provided on each guide wheel 72, or some form of surface roughening or treatment could be applied thereto.

As mentioned above, the system 110 is designed such that the barrier 112, and more particularly the upper and lower cables 124, 126 travel in one direction at all times, regardless of the direction of flow of the tide. Thus, it will be appreciated that as each sail array 119 reaches one of the end portions 70, and travels around same to exit from the end portion 70 travelling in the opposite direction, the sail array 119 itself will be in the reverse orientation, with the trimming vane 66 leading the sails 120 with respect to the direction of tidal flow, as opposed to trailing same as required. However, the provision of the trimming vane 66 means that each sail array 119 acts similar to a weather vane, and thus the tidal flow of water acts in the same way as wind on a weather vane, gradually turning the sail array 119 through 180° about the axle 62, in order to be correctly facing into the direction of tidal flow.

Again this is made possible by having the array 119 statically mass balanced about the axle 62, and having the centre of pressure of the array 119 aligned on the axle 62. In this way the relatively slow tidal flow acting on the vane 66 is sufficient to cause the respective array 119 to rotate through approximately 180° on the axle 62, until the vane 66 is again trailing the sails 120 with respect to the direction of tidal flow.

However, upon exiting the respective end portion 70, each array 119 must now travel across the channel 116 in the opposite direction to the arrays 119 on the parallel or upstream portion of the barrier 112, and thus each of the individual sails 120 must adopt a different optimum angle of attack. In effect the arrays 119 on the downstream side of the barrier 112 must have an angle of attach which is essentially the mirror image of the angle of attack of the arrays 119 on the upstream side of the barrier 112. It will therefore be appreciated that the trimming vane 66 will initially be at an incorrect angle relative to the chord lines of the sails 120, and if maintained at this angle would result in the sails 120 being oriented at an inefficient angle of attack with respect to the direction of tidal flow. For this reason the vane 66 is displaceable between a first position and a second position, as illustrated respectively in FIGS. 13 and 14. In the first position, the vane 66 is positioned to effect travel of the array 119 in one direction across the channel 116, while in the second position the vane 66 will cause the array 119 to travel in the opposite direction across the channel 116. In order to facilitate this displacement between the first and second positions, the vane 66 is pivotally mounted between the struts 68 on a pivot axis 80 adjacent a leading edge 82 of the vane 66.

It is preferable that the vane 66 is automatically switched between the first and second positions as necessary, for example when an array 119 has travelled around one of the end portions 70 and is turned through 180° about the axle 62, in order to again be correctly facing into the direction of tidal flow. Referring to FIGS. 13 to 15, the system 110 is therefore provided with switching means in operative association with each array 119, which switching means are adapted to correctly orient the trimming vane 66 into either the first or second position upon the reversal in orientation of the sail array 119. The switching means, in the embodiment illustrated, is in the form of a resiliently deformable arm 84 projecting from the leading edge 82 of the vane 66, and a corresponding abutment 86 extending downwardly from the underside of the upper cable 124 at the location of the respective sail array 119, with an abutment 86 being positioned on either side of the axle 62. The switching means are not illustrated in any of the drawings other than FIGS. 13 to 15.

As illustrated in FIG. 13, as the array 119 is rotating on the axle 62 from a position in which the vane 66 is leading the sails 120 into a position in which the vane 66 is trailing the sails 120, after approximately 90° of rotation, the vane 66 will pass directly under the top cable 124. As it does so, the arm 84 will contact the abutment 86, and in particular a curved tip 88 thereof, as shown in FIG. 13.

As the array 119 continues to be rotated on the axle 62, the abutment 86 will initially arrest the advance of the arm 84. This will result in the vane 66 being forced from the first position shown in FIG. 13 into the second position shown in FIG. 14, as the vane 66 passes under the upper cable 124. From this position, as the array 119 continues to rotate and the vane 66 therefore moves away from beneath the upper cable 124, the resilient nature of the arm 84 will allow the arm 84 to deform sufficiently to pass over the tip 88 of the abutment 86, as shown in FIG. 15. In this regard, the curved nature of the tip 88 eases the passage of the arm 84 past the tip 88. From the orientation shown in FIG. 15, the array 119 will continue to rotate, as described above, until the vane 66, now switched into the second position, is in parallel alignment with the direction of tidal flow. When so positioned, the sails 120 will be oriented at the optimum angle of attack to generate the maximum force in the direction of arrow B. In use therefore the vane 66 of each array 119 ensure that as the array 119 traverses one of the end portions 70 and begins travelling back across the channel in the opposite direction, the array will be automatically oriented to present the sails 120 at the optimum angle of attack to the tidal flow.

Furthermore, when the tide reverses, as illustrated for example between FIGS. 11A and 11B, each of the sail arrays 119 will again be forced by the tide, similarly to a weather vane, to slowly rotate through 180° about the axle 62, as a result of the provision of the vane 66. When each of the arrays 119 has turned through 180° to face into the oncoming tide, with the vane 66 trailing the sails 120, the vane 66 would again be at the incorrect orientation. However, as described above, the switching means 84, 86 will correct the orientation of the trimming vane 66 as it passes beneath the upper cable 124 during rotation of the array 119 about the axle 62.

Due to the underwater application of the system 110, and in particular the sail arrays 119, it is preferable that the switching means 84, 86 be a simple and robust mechanical arrangement, although it will be appreciated that the arm 84 and abutment 86 could be replaced by any other functional equivalent. For example, some form of linkage arrangement (not shown) could be provided between the axle 62 and the vane 66, which is adapted to displace the vane 66 between the first and second positions in response to rotation of the axle 62. However, any other suitable arrangement may be employed.

It will be appreciated that more than one of the vanes 66 may be provided if required, and the position of the vane 66 may be varied to optimise the performance thereof, for example by locating the vane 66 below the sails 120, again to ensure that the vane 66 is controlled by the main tidal flow and not the flow passing between the sails 120.

It is also preferable that the vane 66, when in each of the first and second positions, experiences a resistance to displacement from that position, in order to maintain the vane 66 in the correct orientation as the respective array 119 traverses the channel 116. This resistance should be sufficient to hold the vane 66 in position during such linear travel of the array 119 across the channel 116, but is overcome when the arm 84 and abutment 86 are forced past one another during the rotational displacement of the array 119. This may be achieved in any suitable manner, for example by the conventional use of ball detents (not shown) provided on the struts 68, with corresponding depressions (not shown) formed in the upper and lower edges of the vane 66. Again any other suitable functional equivalent may be employed.

It is to be understood that the sail array 119 of the second embodiment could be used in combination with the barrier 12 of the first embodiment, in place of the sails 20.

The invention claimed is:
1. An energy conversion system for harnessing tidal energy from a body of water, the system comprising:
   a barrier deployable beneath and across at least a portion of the body of water, and a transducer coupled to the barrier to facilitate the conversion to electrical energy, in use, of tidal pressure exerted on the barrier; and
   in which the barrier comprises at least one sail array comprising a plurality of sails adapted to generate a force transverse to the direction of tidal flow in response to the tidal passage of water past the sails, and thus move the barrier in a direction substantially transverse to the direction in which the tide is flowing, the sails being fixed relative, and in generally parallel spaced relation, to one another, the barrier further comprising a support to which the at least one sail array is secured, the array being hingedly mounted to the support.

2. An energy conversion system according to claim 1 in which each sail comprises a substantially rigid frame.

3. An energy conversion system according to claim 1 in which the configuration of each sail is adaptable to enable the system to function regardless of the direction of flow of the tide.

4. An energy conversion system according to claim 2 in which the support comprises an upper cable and a lower cable.

5. An energy conversion system according to claim 1 in which each sail array comprises trimming means adapted to effect a desired alignment of the sails relative to the direction of tidal flow.

6. An energy conversion system according to claim 5 in which the trimming means comprises a vane located, in use, on a downstream side of the array.

7. An energy conversion system according to claim 5 in which each array is hingedly mounted to the or each support about an axis which substantially corresponds, in use, with the centre of pressure of the array.

8. An energy conversion system according to claim 5 in which each array is hingedly mounted to the or each support about an axis, the array being mass balanced about the axis.

9. An energy conversion system according to claim 4 in which the upper and lower cables each comprise a closed loop.

10. An energy conversion system according to claim 9 comprising guide means at either side of the barrier which respectively define a reversing path along which the upper and lower cables are constrained to move.

11. An energy conversion system according to claim 10 in which the guide means is coupled to the transducer.

12. An energy conversion system according to claim 10 in which the guide means comprises an array of guide wheels at least one of which is driven by the respective upper or lower cable, said at least one guide wheel being coupled to the transducer.

13. An energy conversion system according to claim 12 in which the guide wheels are arranged in pairs mounted in space relation on a respective shaft.

14. An energy conversion system according to claim 5 in which each sail array comprises means for switching the orientation of the respective trimming means between a first position and a second position.

* * * * *